(12) United States Patent
Abraham et al.

(10) Patent No.: US 8,533,178 B1
(45) Date of Patent: Sep. 10, 2013

(54) COLLECTING INFORMATION ABOUT SUGGESTIONS PROVIDED TO USERS

(75) Inventors: Magid M. Abraham, Great Falls, VA (US); David Kapar, Ashburn, VA (US); Cameron S. Meierhoefer, Washington, DC (US)

(73) Assignee: comScore, Inc., Reston, VA (US)

( * ) Notice: Subject to any disclaimer, the term of this patent is extended or adjusted under 35 U.S.C. 154(b) by 1 day.

(21) Appl. No.: 13/008,396

(22) Filed: Jan. 18, 2011

Related U.S. Application Data (60) Provisional application No. 61/295,998, filed on Jan. 18, 2010.

(51) Int. Cl.
*G06F 17/30* (2006.01)
*G06F 17/00* (2006.01)

(52) U.S. Cl.
USPC ............................ 707/713; 707/723; 707/737

(58) Field of Classification Search
USPC .......................................... 707/713, 723, 737
See application file for complete search history.

(56) References Cited

U.S. PATENT DOCUMENTS 8,156,109 B2 * 4/2012 Kamvar et al. ............... 707/713

* cited by examiner

*Primary Examiner* — Yicun Wu
(74) *Attorney, Agent, or Firm* — DiBeradino McGovern IP Group LLC (57) ABSTRACT

A system includes a plurality of client devices and a server system. Each of the client devices is configured to implement at least one web browser and a panel application. The web browser is configured to access a plurality of different web pages that each provide search capability and are each configured to display search suggestions in response to character sequences entered by a user when using the search capability. The panel application is configured to send indications of displayed search suggestions and corresponding character sequences to a server system. The server system is configured to generate, based on the received indications, a data structure that correlates character sequences to lists of phrases.

29 Claims, 4 Drawing Sheets

| Retail Suggestion DB Ranking Velocity Report | | | |
|---|---|---|---|
| January 6, 2011 vs December 6, 2011 | | | |
| Category: All Product Search | | | |
| | | | |
| Term | Pre Rank | Post Rank | Move Score |
| the town | 3,719 | 12 | 308.9 |
| final fantasy | 12,012 | 146 | 81.3 |
| resident evil | 5,697 | 138 | 40.3 |
| alice in wonderland | 7,323 | 186 | 38.4 |
| tron | 1,122 | 29 | 37.7 |
| ipod touch 3rd generation | 3,473 | 92 | 36.8 |
| sex and the city | 12,051 | 329 | 35.6 |
| true blood | 1,592 | 45 | 34.4 |
| easy a | 7,427 | 210 | 34.4 |
| guitar hero | 8,653 | 273 | 30.7 |
| national geographic | 13,789 | 445 | 30.0 |
| need for speed hot pursuit | 10,285 | 352 | 28.2 |
| dean koontz | 8,565 | 300 | 27.6 |
| webcam | 11,089 | 392 | 27.3 |

COLLECTING INFORMATION ABOUT SUGGESTIONS PROVIDED TO USERS

CROSS-REFERENCE TO RELATED APPLICATIONS

This application claims priority to U.S. Application No. 61/295,998, filed on Jan. 18, 2010, the contents of which are incorporated herein.

BACKGROUND

Information about user activities on a network, such as the Internet, may be useful to providers of content.

SUMMARY

In one aspect, a system includes a plurality of client devices and a server system. Each of the client devices is configured to implement at least one web browser and a panel application. The web browser is configured to access a plurality of different web pages that each provide search capability. The web pages are each configured to display search suggestions in response to character sequences entered by a user when using the search capability and the search suggestions include the character sequences. The panel application is configured to access search suggestions displayed by the plurality of different web pages at the client device and access the corresponding character sequences that resulted in the search suggestions being displayed. The panel application is further configured to send one or more indications of the displayed search suggestions and corresponding character sequences to a server system. The server system is configured to receive, from the plurality of client devices, the indications of the displayed search suggestions and corresponding character sequences; and generate, based on the received indications, a data structure that correlates character sequences to lists of phrases.

Implementations may include one or more of the following features. For example, the panel application may be further configured to determine a search suggestion, from among the displayed search selections, selected by the user and send to the server an indication that the selected search selection was selected. The server system may be configured to generate the data structure based on the received indication that the selected search selection was selected in addition to the received indications of the displayed search suggestions and corresponding character sequences.

To access search suggestions displayed by the plurality of different web pages at the client device and access the corresponding character sequences that resulted in the search suggestions being displayed, the panel application may be configured to access search suggestion requests that include character sequences and to access corresponding search suggestion responses that include the search suggestions corresponding to the character sequences. To access search suggestions displayed by the plurality of different web pages at the client device and access the corresponding character sequences that resulted in the search suggestions being displayed, the panel application may be configured to access requests issued by the web browser; apply a set of rules to the accessed requests to detect search suggestion requests from among the accessed requests, the search suggestion requests including character sequences; extract, from the detected search suggestion requests, the character sequences included in the detected search suggestion requests; access search suggestion responses received in response to the detected search suggestion requests, the search suggestion responses including search suggestions; and extract, from the accessed search suggestion responses, the search suggestions included in the search suggestion responses.

At least one of the lists of phrases may be a ranked list of phrases. Each of the phrases in the ranked list may be ranked according to a likelihood that a user intended the phrase for the correlated character sequence. The server system may be further configured to determine, for a character sequence, changes in the correlated list of phrases over time. The server system may be configured to generate, based on the changes in the correlated list of phrases over time, a report on changes in consumer interest. The server system may be configured to generate, based on the changes in the correlated list of phrases over time and information about changes in product offerings, a report on changes in consumer interest as product offerings change.

In another aspect, requests issued by a web browser executing on a client system are accessed. A set of rules are applied to the accessed requests to detect search suggestion requests from among the accessed requests. The search suggestion requests result from different web pages that are each configured to display search suggestions in response to character sequences entered by a user when using search capability provided by the web page. The search suggestion requests include character sequences. The character sequences included in the detected search suggestion requests are extracting from the detected search suggestion requests. Search suggestion responses received in response to the detected search suggestion requests are accessed. The search suggestion responses include search suggestions that include the character sequences included in the corresponding search suggestion requests. The search suggestions included in the search suggestion responses are extracted from the accessed search suggestion responses. One or more indications of the extracted character sequences and the extracted search suggestions are sent to a server system such that the server system generates, based on the received indications, a data structure that correlates character sequences to lists of phrases.

Implementations may include one or more of the following features. For example, the requests issued by the web browser may be HTTP requests and the set of rules may designate uniform resource locators or patterns of uniform resource locators that correspond to destinations for search suggestion requests. A search suggestion, from among the accessed search selections, that was selected by the user may be determined. An indication that the selected search selection was selected may be sent to the server system such that the server system generates the data structure based on the indication that the selected search selection was selected in addition to the indications of the extracted character sequences and the extracted search suggestions. At least one of the lists of phrases may be a ranked list of phrases. Each of the phrases in the ranked list may be ranked according to a likelihood that a user intended the phrase for the correlated character sequence.

In another aspect, indications of search suggestions displayed at the client devices and corresponding character sequences are received from a plurality of client devices. The indications result from a plurality of different web pages displayed at the client systems. The web pages each provide a search capability and are configured to display search suggestions in response to character sequences entered by a user when using the search capability. The search suggestions include the character sequences. A data structure that correlates character sequences to lists of phrases is generated based on the received indications.

Implementations may include one or more of the following features, For example, at least one of the lists of phrases may be a ranked list of phrases and each of the phrases in the ranked list may be ranked according to a likelihood that a user intended the phrase for the correlated character sequence. Changes in the correlated list of phrases over time may be determined for a character sequence. A report on changes in consumer interest may be generated based on the changes in the correlated list of phrases over time. A report on changes in consumer interest as product offerings change may be generated based on the changes in the correlated list of phrases over time and information about changes in product offerings.

Implementations of any of the described techniques may include a method or process, an apparatus, a device, a machine, a system, or instructions stored on a computer-readable storage medium. The details of particular implementations are set forth in the accompanying drawings and description below. Other features will be apparent from the following description, including the drawings, and the claims.

DETAILED DESCRIPTION

Figure 1:
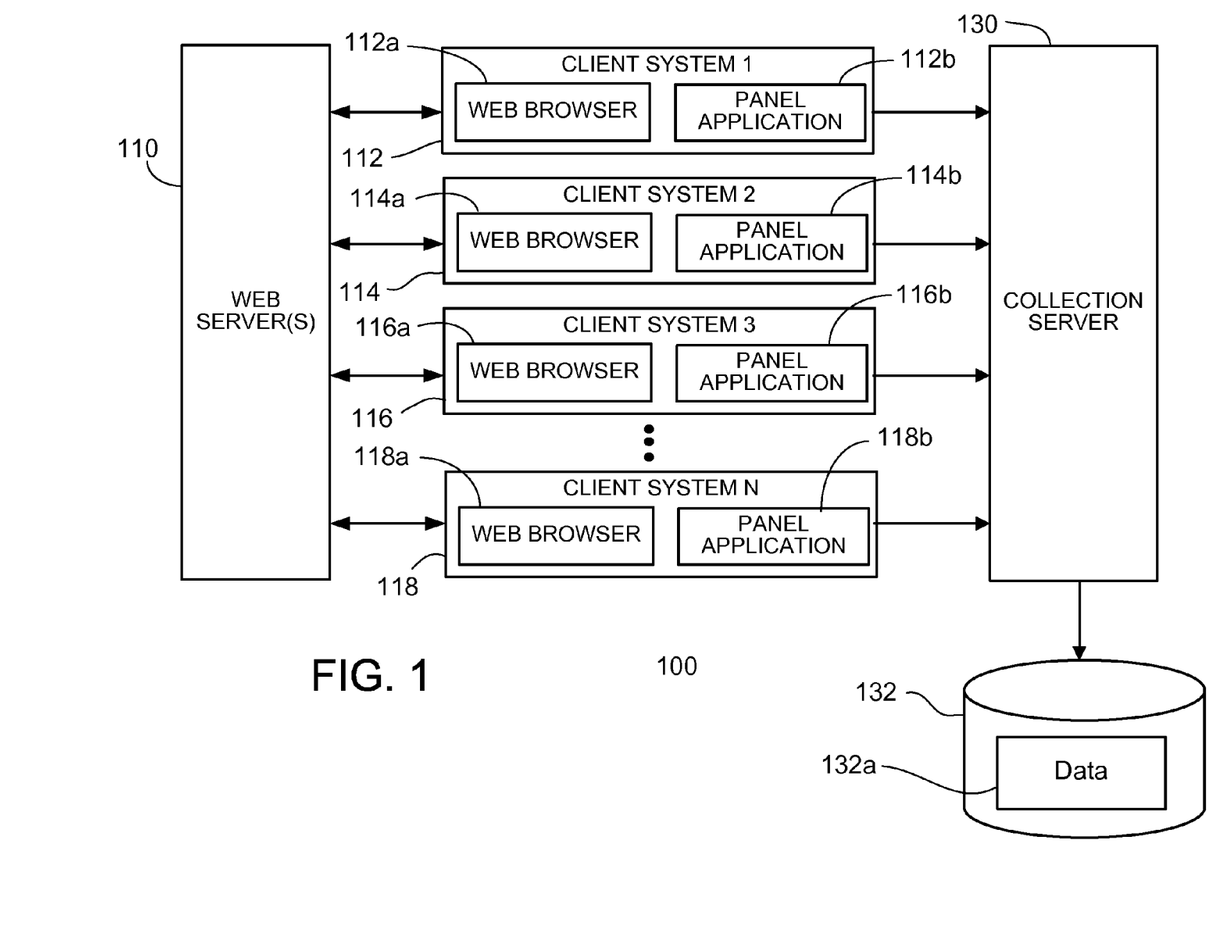
FIG. 1 illustrates an example of a system in which a panel of users may be used to collect information about user activities on a network.

FIG. 1 illustrates an example of a system 100 in which a panel of users may be used to collect information about user activities on a network, such as the Internet. The system 100 includes client systems 112, 114, 116, and 118, one or more web servers 110, a collection server 130, and a database 132. In general, the users in the panel employ client systems 112, 114, 116, and 118 to access resources on the Internet, such as webpages located at the web servers 110. Information about this resource access is sent by each client system 112, 114, 116, and 118 to a collection server 130. This information may be used to understand user habits.

Each of the client systems 112, 114, 116, and 118, the collection server 130, and the web servers 110 may be implemented using, for example, a general-purpose computer capable of responding to and executing instructions in a defined manner, a personal computer, a special-purpose computer, a workstation, a server, or a mobile device. Client systems 112, 114, 116, and 118, collection server 130, and web servers 110 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 112, 114, 116, and 118, collection server 130, and web servers 110.

In the example shown in FIG. 1, the system 100 includes client systems 112, 114, 116, and 118. However, in other implementations, there may be more or fewer client systems. Similarly, in the example shown in FIG. 1, there is a single collection server 130. However, in other implementations there may be more than one collection server 130. For example, each of the client systems 112, 114, 116, and 118 may send data to more than one collection server for redundancy. In other implementations, the client systems 112, 114, 116, and 118 may send data to different collection servers. In this implementation, the data, which represents data from the entire panel, may be communicated to and aggregated at a central location for later processing. The central location may be one of the collection servers.

In system 100, a monitoring application 112b, 114b, 116b, and 118b, also referred to as a panel application, is installed on each of the client systems 112, 114, 116, and 118. The monitoring application 112b, 114b, 116b, and 118b collects information about various resource accesses and/or user activities and sends that information to the collection server 130. For example, the monitoring application 112b, 114b, 116b, and 118b may have access to the network stack of the client system 112, 114, 116, and 118 on which the monitoring application 112b, 114b, 116b, and 118b is installed. The monitoring application 112b, 114b, 116b, and 118b may monitor network traffic to analyze and collect information regarding requests for resources sent from the client system 112, 114, 116, and 118 and subsequent responses. For instance, the monitoring application 112b, 114b, 116b, and 118b may analyze and collect information regarding HTTP requests and subsequent HTTP responses, such as those sent to web servers 110.

Accordingly, when a user of one of the client systems 112, 114, 116, or 118 employs, for example, a web browser 112a, 114a, 116a, or 118a to visit, view, or interact with web pages, information about these activities may be collected and sent to the collection server 130 by the monitoring application 112b, 114b, 116b, and 118b. In some implementations, the monitoring application 112b, 114b, 116b, and 118b may collect and send to collection server 130 information about content sent to the client system 112, 114, 116, or 118 (for example, from web servers 110) in response to user interaction with a web page.

For instance, the monitoring application 112b, 114b, 116b, and 118b may capture search suggestions provided as a user types search characters or terms into a search box on a web page, and send information about such search suggestions to the collection server 130. Some web pages may provide a user with search functionality, such as a text box in which the user can type a search query (composed of one or more characters or terms) and a submit button that can be used to submit the search query. The search functionality may be provided, e.g., either to search the website to which the web page belongs or to search the web in general. As the user types characters in the search box, code, such as Javascript code, in the web page may capture the entered characters, either in whole or in part, and send the characters to a server, which returns search suggestions based on the characters. The code can then display those search or query suggestions to the user, and may do so in a manner that makes each selection separately selectable by the user to initiate a search using the selected search suggestion.

The code can, for instance, capture the text entered into the search box upon each occurrence of a keyup event (e.g., a key on the keyboard raising after being pressed down by the user) and send the text in the search box to the server, which can then return the query suggestions. Thus, query suggestions can be based on a partial set of the search term or terms, with the suggestions being refined as further letters are typed. As an example, a user may type the letter "s" into the search box, which results in query suggestions such as "swine flu," "southwest," and "sparky." The user can continue by typing, for instance, a "p" as the next letter (so that the partial search term is "sp"). As a result, query suggestions such as "sparky,"

"spring break," and "speed test" may be provided. This may continue until the user selects a suggested search query or enters his or her own search query.

As an example, the web page may employ asynchronous Javascript and XML (AJAX) techniques to obtain and display the search suggestions. For instance, Javascript code in the webpage may detect a keyup event and, in response, capture the character sequence in the search box. The Javascript uses an XmlHttpRequest object to send a request that includes the captured character sequence to the server. When the server returns the search suggestions to the XmlHttpRequest object, the Javascript code accesses the search suggestions, and modifies the web page to display the search suggestions.

In general, the monitoring application 112*b*, 114*b*, 116*b*, and 118*b* may analyze and capture information about the requests for the search suggestions sent to the server, and the subsequent response from the server. Some or all of the captured information can then be sent by the monitoring application to the collection server 130.

For example, the monitoring application 112*b*, 114*b*, 116*b*, and 118*b* may implement a filter or set of rules that is used to detect requests for search queries. For instance, the filter or rules may designate URLs or patterns of URLs that correspond to the destinations for requests for search suggestions. The monitoring application 112*b*, 114*b*, 116*b*, and 118*b* may apply the filter or rules to the URLs included in the requests that are observed by the monitoring application 112*b*, 114*b*, 116*b*, and 118*b*. When a URL in a request matches the filter or rules, the monitoring application 112*b*, 114*b*, 116*b*, and 118*b* can extract and record the character sequence included in the request. Once a response to the request is received, the monitoring application 112*b*, 114*b*, 116*b*, and 118*b* can capture the search suggestions that were returned in response to the character sequence included in the request.

Some or all of the information related to the search suggestions (for example, the character sequence and corresponding suggestions) may then be sent by the monitoring application 112*b*, 114*b*, 116*b*, and 118*b* to the collection server 130. The information sent to the collection server 130 may also include an identifier corresponding to the web page, or provider of the webpage, that included the search functionality. In addition, information about the search terms searched for by the user may be sent to the collection server 130 and, to the extent the monitoring application 112*b*, 114*b*, 116*b*, and 118*b* can determine the search terms search for were selected from the search selections, the information may so indicate. The information sent to the collection server 130 may be sent in an XML file, which may indicate the association among the various pieces of information. The collection server 130 may store this information as part of collection data 132*a*.

When the monitoring application 112*b*, 114*b*, 116*b*, and 118*b* is installed across a broad selection of client systems, the system 100 may collect search suggestions across multiple web pages that provide search functionality, and multiple user queries, and therefore provide information across a broad cross-section of search suggestions and corresponding character sequences that resulted in the search suggestions.

In some implementations, the monitoring application 112*b*, 114*b*, 116*b*, and 118*b*, for instance, may collect and send to the collection server 130, either in addition or as an alternative to the information described above, visitation data such as the URLs of web pages or other resources accessed, the times those pages or resources were accessed, and an identifier associated with the particular client system on which the monitoring application is installed (which may be associated with the demographic information collected regarding the user or users of that client system). The collection server 130 receives and records this information. The collection server 130 may aggregate the recorded information from the client systems and store this aggregated information in the database 132 as collection data 132*a*.

The collected information can be used to construct, for instance, a database or other data structure that can be interrogated with a character sequence, and return the most likely complete phrases that a user intends. This can be constructed based on the search suggestion data alone, or the search suggestion information combined with the visitation data. For instance, the collected data may reflect character sequences entered by actual users, the suggested search selections corresponding to those character sequences (as well as any refinements to the suggestions as the user continued to enter characters), the search query ultimately searched by the user (and whether those terms were selected from the set of suggested search queries), and whether the user selected any of the search results (and, if so, which results). This information may also indicate whether the user made similar searches after looking at the search results. Also, the data can indicate the changes to search suggestions over time, and/or the variation of suggestions for certain terms/character sequences among web pages that provide search functionality.

Some or all of this information can be analyzed to rank sets of one more phrases with respect to the likelihood that a user intends the phrases for a given character sequence, and the ranking information can be stored in a database or other data structure. The data structure can be used to provide search suggestions. Alternatively, or additionally, the data structure can be used in other applications in which it is useful to discern a user intended phrase from a set of character sequences. The data structure may also be used in combination with other panel data to build algorithms or statistical models that deliver targeted search suggestions.

In some implementations, the visitation data, either alone or in combination with the search suggestion data described above or other collected data, may be analyzed to determine the visitation or other habits of users in the panel, which may be extrapolated to the larger population of all Internet users. The users of the client systems 112, 114, 116, and 118 may be a group of users that are a representative sample of the larger universe being measured, such as the universe of all Internet users or all Internet users in a geographic region. To understand the overall behavior of the universe being measured, the behavior from this sample may be projected to the universe being measured. The size of the universe being measured and/or the demographic composition of that universe may be obtained, for example, using independent measurements or studies. For example, enumeration studies may be conducted monthly (or at other intervals) using random digit dialing.

The users in the panel may be recruited by an entity controlling the collection server 130, and the entity may collect various demographic information regarding the users in the panel, such as age, sex, household size, household composition, geographic region, and household income. The techniques chosen to recruit users may be chosen or developed to help insure that a good random sample of the universe being measured is obtained, biases in the sample are minimized, and the highest manageable cooperation rates are achieved. Once a user is recruited, the monitoring application is installed on the user's client system to collect the information about the user's use of the client system to access resources on the Internet and to send that information to the collection server 130.

The information collected during a particular time period (session) can be associated with a particular user of the client system (and/or his or her demographics) that is believed or known to be using the client system during that time period. For example, the monitoring application may require the user to identify his or herself, or techniques such as those described in U.S. Patent Application No. 2004-0019518 or U.S. Pat. No. 7,260,837, both incorporated herein by reference, may be used. Identifying the individual using the client system may allow the usage information to be determined and extrapolated on a per person basis, rather than a per machine basis. In other words, doing so allows the measurements taken to be attributable to individuals across machines within households, rather than to the machines themselves.

To extrapolate the usage of the panel members to the larger universe being measured, some or all of the members of the panel may be weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample (those included in the weighting and projection) are weighted to insure that the reporting sample reflects the demographic composition of the universe to be measured, and this weighted sample is projected to the universe. This may be accomplished by determining a projection weight for each member of the reporting sample and applying that projection weight to the usage of that member.

The usage behavior of the weighted and projected sample is then considered a representative portrayal of the behavior of the defined universe. Behavioral patterns observed in the weighted, projected sample are assumed to reflect behavioral patterns in the universe.

Reports can be generated from this information. For example, this data may be used to estimate the number of unique visitors visiting certain web pages or groups of web pages, or unique visitors within a particular demographic visiting certain web pages or groups of web pages. This data may also be used to determine other estimates, such as the frequency of usage per user, average number of pages viewed per user, and average number of minutes spent per user.

Figure 2A:
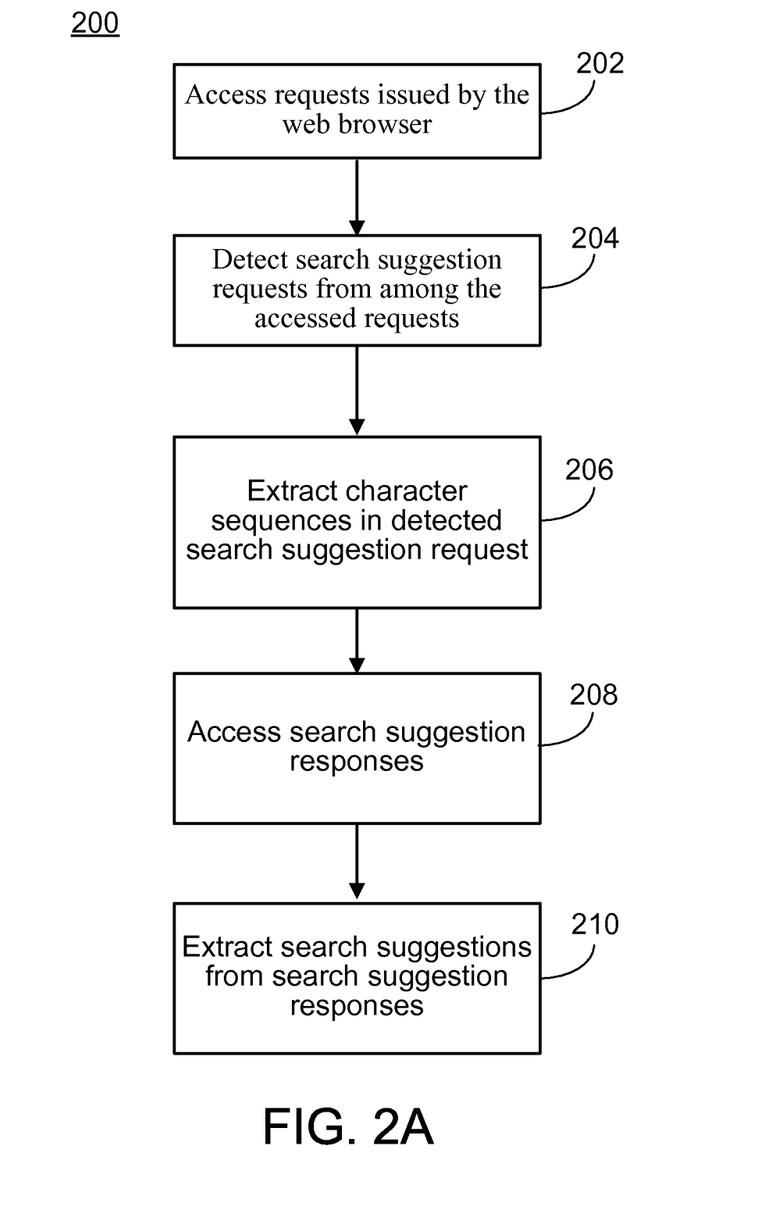
FIGS. 2A and 2B are a flow chart illustrating an example of a process 200 that may be used to collect and employ search suggestions.
Figure 2B:
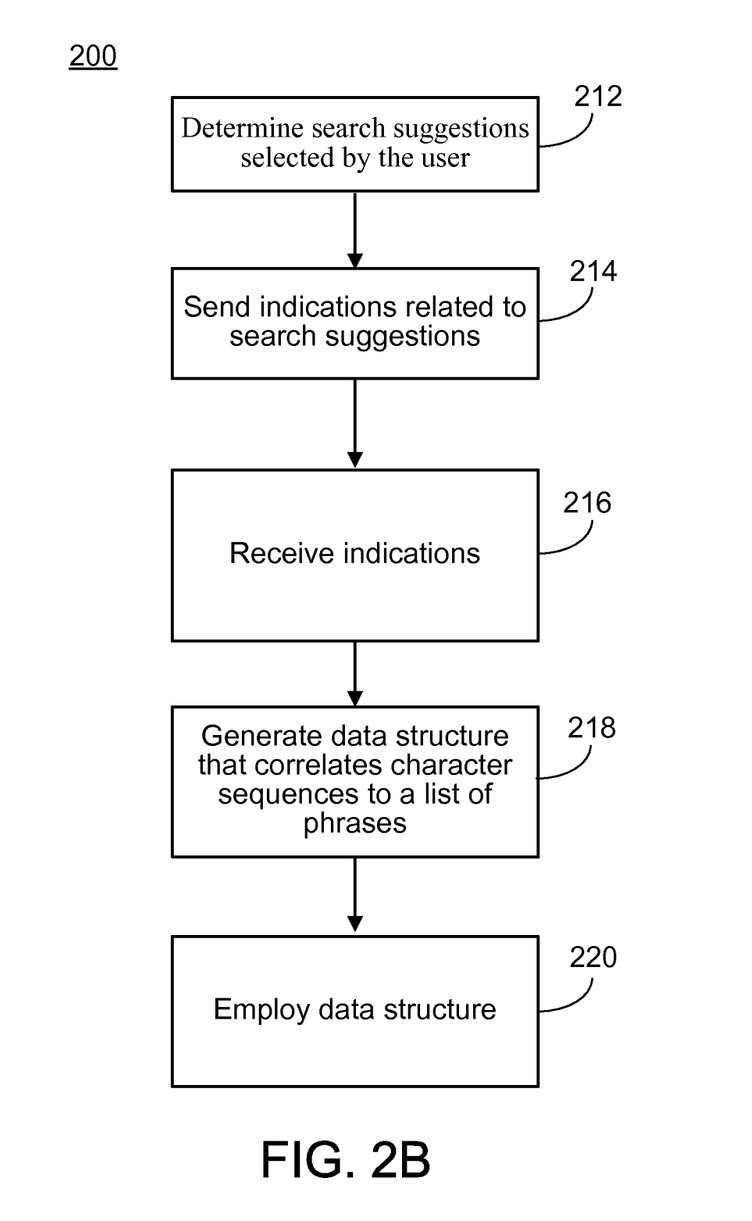

FIGS. 2A and 2B are a flow chart illustrating an example of a process 200 that may be used to collect and employ search suggestions. The following describes process 200 as being performed by the system 100. However, the process 200 may be performed by other systems or system configurations.

A panel application 112b accesses requests issued by the web browser 112a executing on a client system 112 (202). For example, the web browser 112a may issue HTTP requests for web pages and other resources as a user of the client system 112 employs the web browser 112a to navigate to different web pages. During the course of navigating to different web pages, the user may navigate to different web pages that are each configured to display search suggestions in response to character sequences entered by a user when using search capability provided by the web page. When the user employs the search capability of a web page by entering character sequences, the web browser 112a may issue requests for search suggestions to a server and those requests may include the entered character sequences The panel application 112b applies a set of rules to the accessed requests to detect search suggestion requests from among the accessed requests (204) and extracts, from the detected search suggestion requests, the character sequences included in the detected search suggestion requests (206). For example, as described above, the panel application may employ a set of rules that designate URLs or patterns of URLs that correspond to the destinations for requests for search suggestions. The panel application 112b may apply the rules to the URLs included in the accessed requests to detect those that are search suggestion requests. Once a search suggestion request is detected, the panel application 112b extracts the character sequence that is included in the request. For example, the panel application 112b may access a set of rules that define where the character sequence is included in the structure of the search suggestion request, and employ those rules to extract the character sequence.

The panel application also accesses search suggestion responses received in response to the detected search suggestion requests (208). In general, when a search suggestion request is sent to a server, the server sends back a search suggestion response that includes search suggestions that correspond to the character sequence sent in the search suggestion request. The returned search suggestions may all include the corresponding character sequences.

The panel application 112b extracts, from the accessed search suggestion responses, the search suggestions included in the search suggestion responses (210). For example, the panel application 112b may access a set of rules that define where the search suggestion results are included in the structure of the search suggestion response, and employ those rules to extract the search suggestions. The panel application 112b also may track which search suggestion responses correspond to which search suggestion requests so that the search suggestions can be associated with the corresponding character sequences.

The panel application 112b may determine search suggestions that were selected by the user (e.g., selected either by selecting the displayed search suggestion or by completing the typing of the search term(s) corresponding to the search suggestion) (212). For example, in some cases, the web browser 112a may issue a search request with the selected search suggestion or, more generally, issue search requests that include search terms, whether or not those terms were selected from a set of search suggestions. The panel application 112b may include a set of rules that designate URLs or patterns of URLs that correspond to destinations for search requests. The rules may also designate where the search terms are located within those request. Using those rules, the panel application 122b may extract the search terms, which correspond to the selected search suggestion, from the search request.

The panel application 112b can simply collect all search terms issued in search requests (for example, with an indication of which web page was used for the search terms), without specific information about whether or not such search terms were included in search suggestions displayed at the client system 112. In some implementations, the panel application 112b may track that those search terms issued in search requests that were also included in search suggestions displayed at the client system 112, and note this fact in association with the search terms. In yet other implementations, the panel application 112b may determine that a user affirmatively selected one of the search suggestions (for example, by clicking on the suggestion from a displayed list of the suggestions), and note this fact in association with the search term corresponding to the selected suggestion.

The panel application 112b sends one or more indications related to the search suggestions to the collection server 130 (214). For instance, the panel application 112b sends of indications of the extracted character sequences and the extracted search suggestions to the collection server 130. As another example, the panel application 112b may send an indication of selected search suggestions. For instance, the panel application 112b may simply send search terms employed in a search (which will inherently indicate those that were part of the search suggestions), or may send more specific indications of whether the search terms were included in search suggestions or whether the user affirmatively selected the search terms from a list of search suggestions.

If just the search terms are sent, whether or not the search terms were selected from a list of suggestions may be inferred from information about the search terms and information about the search suggestions. For instance, if the information reflects that a list of search suggestions were received and the next request issued by the browser was a search request that includes search terms from the list of search suggestions, then it is likely the user selected the search terms from the suggestions. As a more specific example, a search suggestion request is sent with the character sequence "sp," with a search suggestion response being received that includes the suggestion "sparky." If the next search related request issued by the browser is a search request that includes the search term "sparky," then it is likely the user selected the suggestion "sparky" from the list of suggestions. The collection server 130, or another server, may be able to make such determinations based on the information received from the panel application 112b.

The collection server 130 receives, from the plurality of client devices 112, 114, 116, and 118, the indications sent by the panel application 112b, and similar indications sent by panel applications 114b, 116b, and 118b (216). The collection server 130, or another server forming part of a server system with the collection server 130, generates a data structure that correlates character sequences to lists of phrases based on the received indications (218). A given list of phrases may be a ranked list of phrases, with each of the phrases in the ranked list being ranked according to a likelihood that a user intended the phrase for the correlated character sequence.

The collection server 130, or another server, may employ the generated data structure (220). As described above, the data structure may be employed in a number of manners. For example, the data structure can be used to provide search suggestions. Alternatively, or additionally, the data structure can be used in other applications in which it is useful to discern a user intended phrase(s) from a character sequence. For example, in the retail environment, the data structure can be used to understand changing consumer preferences, particular as product offerings change. In general, over time, a given character sequence may correspond to a changing list of search suggestions. This may occur, for example, as users search for new product offerings, or change their interest to now search for products that may have been offered previously, but were not popular.

Thus, for example, a server system may use the data structure to determine, for a character sequence, changes in the correlated list of phrases over time. Based on the changes in the correlated list of phrases over time, the server system may generate a report on changes in consumer interest. Alternatively, or additionally, based on the changes in the correlated list of phrases over time and information about changes in product offerings, the server system may generate a report on changes in consumer interest as product offerings change.

As an example, a report may indicate frequently entered character sequences, along with the changes in associated phrases, or changes in the rankings of those phrases, over time. When the phrases correspond to products, this may indicate changes in consumer interest as product offerings change.

As another example, a report may simply indicate, for a given character sequence, the phrases that correspond to products. This may provide merchants insight into what products consumers are searching for in addition to products known to the merchant. For example, such a report could indicate items other than "computers" that consumers are searching for when entering the character sequence "comp."

Figure 3:
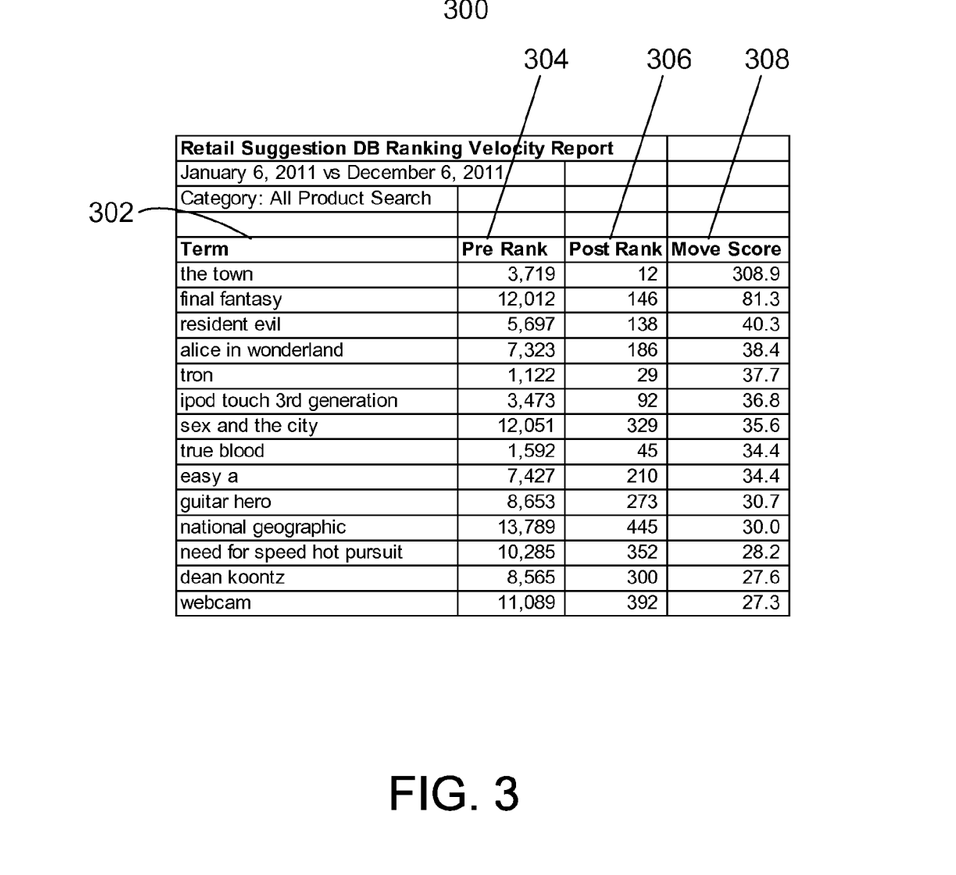
FIG. 3 is illustrates an example of a report.

FIG. 3 illustrates an example of a report 300 that shows phrases that have increasingly been included as part of search suggestions over a particular period of time. The report 300 includes a phrase column 302, a previous rank column 304, a current rank column 306, and a move score column 308. The phrase column 302 includes the phrases. The previous rank column 302 includes the rank of the corresponding phrase in the previous time period. In general, a phrase's rank may be based on the number of times that phrase was included in search suggestions over the relevant time period. The current rank column 306 includes the rank of the corresponding phrase in the current period of time. The move score column 308 includes a move score that corresponds to the magnitude of the change in rank between the previous period and the current period, and may be calculated based on those two rankings.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

Accordingly, other implementations are within the scope of the following claims.

What is claimed is:

1. A system for monitoring, collecting, and correlating search data provided to users by multiple web pages that provide search functionality, the system comprising:
a plurality of client devices, wherein each of the client devices is configured to implement:
at least one web browser executed by the client device configured to render a plurality of different web pages, each of the plurality of different web pages providing a search capability when the webpage is rendered by the at least one browser, wherein the rendered, different web pages are each configured to display search suggestions in response to character sequences entered by a user when using the search capability of the rendered web page;
a monitoring application executed by the client device configured to:
access a character sequence of one more characters entered by a user in response to a search capability provided by one of the plurality of different web pages;
access the search suggestions displayed by the one of the plurality of different web pages rendered at the client device corresponding to the accessed character sequence that resulted in the search suggestions being displayed; and
send data including indications of the accessed displayed search suggestions and the accessed character sequence corresponding to the displayed search suggestions to a server system; and
the server system configured to:
receive, from the plurality of client devices, the data including the indications of the displayed search suggestions and the corresponding character sequence; and
generate, based on the received data, a data structure that correlates character sequences to lists of phrases.

2. The system of claim 1 wherein:
the monitoring application is further configured to determine a search suggestion, from among the displayed search selections, selected by the user and send to the server an indication that the selected search selection was selected; and
the server system is configured to generate the data structure based on the received indication that the selected search selection was selected in addition to the received data.

3. The system of claim 1 wherein:
to access search suggestions displayed by the one of the plurality of different web pages at the client device and access the corresponding character sequence that resulted in the search suggestions being displayed, the monitoring application is configured to access search suggestion requests that include character sequences and to access corresponding search suggestion responses that include the search suggestions corresponding to the character sequences.

4. The system of claim 1 wherein, to access search suggestions displayed by the one of the plurality of different web pages at the client device and access the corresponding character sequence that resulted in the search suggestions being displayed, the monitoring application is configured to:
access requests issued by the web browser;
apply a set of rules to the accessed requests to detect search suggestion requests from among the accessed requests, the search suggestion requests including character sequences;
extract, from the detected search suggestion requests, the character sequences included in the detected search suggestion requests;
access search suggestion responses received in response to the detected search suggestion requests, the search suggestion responses including search suggestions; and
extract, from the accessed search suggestion responses, the search suggestions included in the search suggestion responses.

5. The system of claim 1 wherein at least one of the lists of phrases is a ranked list of phrases, each of the phrases in the ranked list being ranked according to a likelihood that a user intended the phrase for the correlated character sequence.

6. The system of claim 1 wherein the server system is further configured to determine, for a character sequence, changes in the correlated list of phrases over time.

7. The system of claim 6 wherein the server system is further configured to generate, based on the changes in the correlated list of phrases over time, a report on changes in consumer interest.

8. The system of claim 6 wherein the server system is further configured to generate, based on the changes in the correlated list of phrases over time and information about changes in product offerings, a report on changes in consumer interest as product offerings change.

9. The system of claim 1 wherein:
the monitoring application is further configured to determine an identifier corresponding to the one of the plurality of web pages, or provider of the one of the plurality of web pages, that provides the search suggestions and send to the server the identifier; and
the server system is configured to generate the data structure based on the received identifier.

10. A method of monitoring search data provided to users by multiple web pages that provide search functionality, the method comprising:
accessing, by a monitoring application executing on a client system, requests issued by a web browser executing on the client system to a plurality of web pages hosted by one or more servers;
applying, by the monitoring application executing on the client system, a set of rules to the accessed requests to detect from among the accessed requests those requests that are search suggestion requests resulting from the web browser rendering different web pages that are each configured to display search suggestions in response to character sequences entered by a user when using a search capability provided by the rendered web page, the search suggestion requests including character sequences;
extracting, by the monitoring application executing on the client system, from the detected search suggestion requests, the character sequences included in the detected search suggestion requests;

accessing, by the monitoring application executing on the client system, search suggestion responses received from one or more servers providing the search functionality, the search suggestion responses corresponding to the detected search suggestion requests and including search suggestions corresponding to the search suggestion requests;

extracting, by the monitoring application executing on the client system, from the accessed search suggestion responses, the search suggestions included in the search suggestion responses; and sending, by the monitoring application executing on the client system, data including indications of the extracted character sequences and the corresponding extracted search suggestions to a collection server system such that the collection server system generates, based on the sent data, a data structure that correlates character sequences to lists of phrases.

11. The method of claim 10 wherein the requests issued by the web browser are HTTP requests and the set of rules designate uniform resource locators or patterns of uniform resource locators that correspond to destinations for search suggestion requests.

12. The method of claim 10 further comprising:

determining a search suggestion, from among the accessed search suggestions, that was selected by the user;

sending to the server system an indication that the selected search selection was selected such that the server system generates the data structure based on the indication that the selected search selection was selected in addition to the sent data.

13. The method of claim 10 wherein at least one of the lists of phrases is a ranked list of phrases, each of the phrases in the ranked list being ranked according to a likelihood that a user intended the phrase for the correlated character sequence.

14. The method of claim 10 further comprising:

determining an identifier corresponding to the one of the plurality of web pages, or provider of the one of the plurality of web pages, that provides the search suggestions; and sending to the server system the identifier such that the server system generates the data structure based on the identifier.

15. A method, implemented by one or more servers, of collecting and correlating search data provided to users by multiple web pages that provide search functionality, the method comprising:

receiving, from a client device, data including indications of search suggestions displayed at the client device and an indication of the corresponding character sequence entered by a user of the client device that resulted in the search suggestions being provided to the client device, wherein the data result from one of a plurality of different web pages rendered at the client device, the rendered web pages providing a search capability and being configured to display search suggestions in response to a character sequence entered by a user when using the search capability;

receiving, from another client device, data including indications of search suggestions displayed at the another client device and an indication of the corresponding character sequence entered by a user of the another client device that resulted in the search suggestions being provided to the another client device, wherein the other data result from one of the plurality of different web pages rendered at the another client device, the rendered web page providing a search capability and being configured to display search suggestions in response to a character sequence entered by a user when using the search capability; and generating, based on the received data, a data structure that correlates character sequences to lists of phrases.

16. The method of claim 15 wherein at least one of the lists of phrases is a ranked list of phrases, the method further comprising ranking each of the phrases in the ranked list according to a likelihood that a user intended the phrase for the correlated character sequence.

17. The method of claim 15 further comprising determining, for a character sequence, changes in the correlated list of phrases over time.

18. The method of claim 17 further comprising generating, based on the changes in the correlated list of phrases over time, a report on changes in consumer interest.

19. The method of claim 17 further comprising generating, based on the changes in the correlated list of phrases over time and information about changes in product offerings, a report on changes in consumer interest as product offerings change.

20. A computer readable storage medium configured to monitor search data provided to users by multiple web pages that provide search functionality, the computer readable storage medium storing instructions that, when executed by one or more processing devices, cause the one or more processing devices to:

access requests issued by a web browser executing on a client system to a plurality of web pages hosted by one or more servers;

apply a set of rules to the accessed requests to detect from among the accessed requests those requests that are search suggestion requests resulting from the web browser rendering different web pages that are each configured to display search suggestions in response to character sequences entered by a user when using a search capability provided by the rendered web page, the search suggestion requests including character sequences;

extract, from the detected search suggestion requests, the character sequences included in the detected search suggestion requests;

access search suggestion responses received from one or more servers providing the search functionality, the search suggestion responses corresponding to the detected search suggestion requests and including search suggestions corresponding to the search suggestion requests;

extract, from the accessed search suggestion responses, the search suggestions included in the search suggestion responses; and send data including indications of the extracted character sequences and the corresponding extracted search suggestions to a collection server system such that the collection server system generates, based on the received data, a data structure that correlates character sequences to lists of phrases.

21. The medium of claim 20 wherein the requests issued by the web browser are HTTP requests and the set of rules designate uniform resource locators that correspond to destinations for search suggestion requests.

22. The medium of claim 20 wherein the instructions include instructions that, when executed by one or more processing devices, cause the one or more processing devices to:

determine a search suggestion, from among the accessed search suggestions, that was selected by the user;

send to the server system an indication that the selected search selection was selected such that the server system generates the data structure based on the indication that the selected search selection was selected in addition to the sent data.

23. The medium of claim 20 wherein at least one of the lists of phrases is a ranked list of phrases, each of the phrases in the ranked list being ranked according to a likelihood that a user intended the phrase for the correlated character sequence.

24. A computer readable storage medium configured to collect and correlate search data provided to users by multiple web pages that provide search functionality, the computer readable storage medium storing instructions that, when executed by one or more processing devices, cause the one or more processing devices to:
receive, from a client device, data including indications of search suggestions displayed at the client device and an indication of the corresponding character sequence entered by a user of the client device that resulted in the search suggestions being provided to the client device, wherein the data result from one of a plurality of different web pages rendered at the client device, the rendered web page providing a search capability and being configured to display search suggestions in response to a character sequence entered by a user when using the search capability;
receive, from another client device, data including indications of search suggestions displayed at the another client device and an indication of the corresponding character sequence entered by a user of the another client device that resulted in the search suggestions being provided to the another client device, wherein the other data result from one of the plurality of different web pages rendered at the another client device, the rendered web page providing a search capability and being configured to display search suggestions in response to a character sequence entered by a user when using the search capability; and
generate, based on the received data, a data structure that correlates character sequences to lists of phrases.

25. The medium of claim 24 wherein at least one of the lists of phrases is a ranked list of phrases, the instructions including instructions that, when executed by one or more processing devices, cause the one or more processing devices to rank each of the phrases in the ranked list according to a likelihood that a user intended the phrase for the correlated character sequence.

26. The medium of claim 24 wherein the instructions include instructions that, when executed by one or more processing devices, cause the one or more processing devices to determine, for a character sequence, changes in the correlated list of phrases over time.

27. The medium of claim 26 wherein the instructions include instructions that, when executed by one or more processing devices, cause the one or more processing devices to generate, based on the changes in the correlated list of phrases over time, a report on changes in consumer interest.

28. The medium of claim 26 wherein the instructions include instructions that, when executed by one or more processing devices, cause the one or more processing devices to generate, based on the changes in the correlated list of phrases over time and information about changes in product offerings, a report on changes in consumer interest as product offerings change.

29. The method of claim 15 wherein receiving the data includes receiving an identifier corresponding to the rendered web page, or provider of the render web page, that provides the search suggestions.

* * * * *